United States Patent [19]

Toyoshima et al.

[11] 4,132,686
[45] Jan. 2, 1979

[54] PROCESS FOR COATING EMPLOYING A TWO-PACK TYPE AQUEOUS PAINT COMPOSITION

[75] Inventors: Kazuaki Toyoshima, Sakura; Michitoshi Koyanagi, Narashino; Tameyuki Suzuki, Zushi, all of Japan

[73] Assignee: Shinto Paint Co., Ltd., Amagasaki, Japan

[21] Appl. No.: 765,360

[22] Filed: Feb. 3, 1977

[51] Int. Cl.$^2$ .................. B44D 1/44; C09D 3/52; C09D 3/64

[52] U.S. Cl. .................. 260/21; 260/22 CQ; 260/22 A; 260/29.2 E; 260/29.4 R; 260/29.4 UA; 260/29.6 R; 260/29.6 NR; 260/29.6 MN; 427/333; 427/407 R; 427/426

[58] Field of Search .......... 260/22 A, 22 CQ, 29.2 E, 260/29.6 MN, 29.6 R, 29.6 NR, 29.4 R, 29.4 UA, 21; 427/426, 333, 407 R

[56] References Cited

U.S. PATENT DOCUMENTS

| | | | |
|---|---|---|---|
| 2,048,778 | 7/1936 | Brubaker et al. | 260/22 A |
| 2,059,791 | 11/1936 | Hennegan | 260/26 |
| 2,511,627 | 6/1950 | Einbecker | 427/426 |
| 2,864,722 | 12/1958 | Millar et al. | 427/333 |
| 3,077,459 | 2/1963 | Hershey et al. | 260/22 R |
| 3,135,625 | 6/1964 | Ingrassia | 427/333 |
| 3,179,341 | 4/1965 | Plos et al. | 427/426 |
| 3,224,992 | 12/1965 | Stephens | 260/22 A |
| 3,349,049 | 10/1967 | Seiwert et al. | 260/22 TN |
| 3,474,060 | 10/1969 | Dhein et al. | 260/29.2 UA |
| 3,527,721 | 9/1970 | Honel et al. | 260/29.2 UA |
| 3,527,729 | 9/1970 | Bingham et al. | 260/40 TN |
| 3,631,136 | 12/1971 | Spiller | 260/29.2 E |
| 3,953,644 | 4/1976 | Camelon et al. | 427/407 R |
| 3,957,709 | 5/1976 | Holzrichter et al. | 260/29.4 R |
| 3,960,789 | 6/1976 | Daimer et al. | 260/21 |
| 3,972,845 | 8/1976 | Nikaido et al. | 260/29.2 UA |
| 4,025,474 | 5/1977 | Porter et al. | 260/29.4 UA |

FOREIGN PATENT DOCUMENTS

| | | | |
|---|---|---|---|
| 47-26656 | 7/1972 | Japan | 427/333 |
| 1040828 | 9/1966 | United Kingdom | 260/22 A |

OTHER PUBLICATIONS

Canadian Paint and Varnish, Feb., 1963, pp. 18-21 and 38.

*Primary Examiner*—Ronald W. Griffin
*Attorney, Agent, or Firm*—Armstrong, Nikaido, Marmelstein & Kubovcik

[57] ABSTRACT

An improvement in a process for coating a surface with a aqueous paint composition containing as the primary film-forming components: a synthetic polycarboxylic acid resin as the main binder component; an amino resin as a heat curing cross-linking agent for the polycarboxylic acid resin and a neutralizing agent for neutralizing the acid groups of the polycarboxylic acid resin, is provided. The improvement is applying the aqueous paint composition to the surface as two compositions (A) comprising a synthetic polycarboxylic acid resin having a neutralization degree of 30 to 70% and an amino resin; and (B) comprising a synthetic polycarboxylic acid resin having a neutralication degree 30 to 80% higher than that of the polycarboxylic acid resin of (A) and an amino resin, or (C) a neutralizing agent comprising ammonia or an organic amine.

15 Claims, No Drawings

PROCESS FOR COATING EMPLOYING A TWO-PACK TYPE AQUEOUS PAINT COMPOSITION

The present invention relates to a two-pack or two-part type aqueous paint composition having improved film-forming properties, and more particularly to a two-pack type aqueous paint composition free from disadvantages of conventional one-pack type paints, such as the sag of painted film, formation of pinholes, unevenness of spray-coated surfaces, incapability of forming thick film, etc.

Generally, for paint compositions, there are used organic solvents and such organic solvent type paints are not desirable from the viewpoint of air pollution, material economy and safety of work. Therefore, there is recently a tendency of transition from organic solvent type paints to aqueous type paints. Such aqueous paints are generally of one-pack type and are applied to objects to be painted, directly as such or after dilution with water when they are thick compositions.

Most of the conventional aqueous paints are advantageous from the standpoint of their giving no air pollution inherent in organic solvents and from their safety of work because when applied in a concentration suitable for usual painting method the diluent is composed mainly of water. But the painted films are liable to cause sag and unevenness of sprayed surfaces because of their slow evaporation speed, so that it is difficult to form a thick film. Moreover, they have a disadvantage that pinholes are liable to occur upon baking painted films. Especially, where metal powder (usually aluminum pigment) is contained in the paint composition, the powder particles are liable to move and cannot be arranged uniformly in the film, so that such aqueous paints have a defect that the painted film cannot obtain a desired beautiful finished surface.

Further, for conventional aqueous paints it has been required to strictly control painting environmental conditions, for example the temperature, humidity and air current velocity of the painting booth, and therefore the management in practical use has been very difficult.

In conventional one-pack aqueous paint compositions, there is used as the main binder component a natural or synthetic resin. Especially in recent years, polycarboxylic acid resins have become to be used in many cases. These polycarboxylic acid resins are completely neutralized to an excess of the equivalent for the carboxyl groups in the resin with an alkaline substance (usually ammonia or an amine) in order to dissolve the resin completely in water and to prepare a stable solution. However, by using such an alkaline substance, the viscosity of the resulting paint composition increases and this makes painting operation difficult. Further, it becomes necessary to use a relatively large amount of a diluent such as water to lower the viscosity, and this causes sag of the paint and unevenness of the sprayed surface, making the painting operation extremely difficult.

The object of the present invention, therefore, is to provide a two-pack aqueous paint composition which overcomes the above mentioned disadvantages of conventional aqueous paint compositions.

The present invention provides a two-pack aqueous paint composition which comprises (1) an aqueous paint (Paint A) composed mainly of a synthetic polycarboxylic acid resin having a neutralization degree of not higher than 70% and (2) an aqueous paint (Paint B) composed mainly of a synthetic polycarboxylic acid resin having a neutralization degree higher than that of Paint A, or a neutralizing agent comprising ammonia and/or an amine (Neutralizing Agent C). When the Paint A and Paint B, or Paint A and Neutralizing Agent C are mixed into contact upon application, the viscosity of the coated film is increased.

The Paint A used in the present invention is composed mainly of a synthetic carboxylic acid resin having a neutralization degree of not higher than 70%, with which an amino resin as the heat curing cross-linking agent, and if necessary an inorganic or organic pigment, metal powder or other additives are mixed by kneading, and to which water and if necessary a hydrophilic organic solvent or a mixture of the latter with a hydrophobic solvent are added according to circumstances. The term "neutralization degree" is based on the number of the acid groups in the resin. Thus, for example, when 30% of the total number of the acid groups in the resin is neutralized the neutralization degree is referred to as 30%. The concentration of the solid matter in Paint A may be such as to be suitable for the actual painting use, but it is possible to prepare a thick composition which is suitably diluted on use with water and a diluent which can dissolve said paint. Preferably the neutralization degree of the resin in the Paint (A) is 30-70%.

The synthetic polycarboxylic acid resins having a neutralization degree of not higher than 70% to be used in Paint A include (a) polymers or copolymers obtained by polymerizing or copolymerizing one or more of carboxyl group-containing monomers such as acrylic acid, methacrylic acid, itaconic acid, fumaric acid, synthetic resin acid, vinyl acetate or one or more monomers such as acrylic acid esters, methacrylic acid esters, styrene, etc. copolymerizable with said carboxyl group-containing monomers, said polymers or copolymers having a number average molecular weight of above 2000 and an acid value of 10–150, and neutralized with a neutralizing agent for not higher than 70% of the acid groups present in the molecule; and (b) oil-free alkyd resins or modified alkyd resins synthesized by using an acid such as maleic acid anhydride, phthalic acid anhydride, adipic acid, tetrahydrophthalic acid anhydride, trimellitic acid, etc. and a polyhydric alcohol such as ethylene glycol, propylene glycol, trimethylolpropane, sorbitol, glycerine, pentaerythritol, etc., and if necessary a fatty acid, fat or oil, petroleum resin or epoxy resin, said alkyd resins or modified alkyd resins having a number average molecular weight of above 2000 and an acid value of 10–150, and neutralized with a neutralizing agent for not higher than 70% of the acid groups.

The neutralizing agent used for neutralizing the acid groups in the polycarboxylic acid resins includes ammonia and organic amines such as methylamine, dimethyltriamine, triethylamine, monoisopropanolamine, diisopropanolamine, dimethylethanolamine, morpholine, diethylenetriamine, etc.

The amino resins to be used in the Paint A are heat curing cross-linking agents and include condensation products of formaline with melamine, urea or benzoguanamine, and resins formed by etherifying them with methyl alcohol or butyl alcohol, etc. according to need. The ratio of amino resin/polycarboxylic acid resin is generally 10/90 to 35/65.

The pigments or other additives that can be used in Paint A may be any of those well-known to one skilled in the art, and include inorganic pigments such as titanium white, carbon black, ion oxide, yellow lead oxide, strontium chromate, etc., organic pigments such as Permanent Red, Lake Red, Hansa Red, Cyanine Blue, etc., and aluminum pigments of leafing type or non-leafing type. The ratio of pigment/resin is usually 0/1 to 1/0.6. Also, surface regulating agents such as anti-repelling agents, leveling agents, antifloating agents, antiflooding agents, color separation preventing agents, etc. may be used. The ratio of additive/resin is usually 1/100000 to 1/100.

The Paint B used in the present invention is composed mainly of a synthetic polycarboxylic acid resin having a neutralization degree higher than that of the acid resin used for Paint A, with which an amino resin and if necessary a pigment or other additives are mixed by kneading, and to which water and if necessary a hydrophilic organic solvent or a mixture of the latter with some portion of a hydrophobic organic solvent are added according to circumstances. As in the case of Paint A, the concentration of the solid matter contained in Paint A may be such as to be suitable for the actual painting use but it is also possible to prepare a thick composition which is suitably diluted on use with water and a diluent which can dissolve said paint.

The synthetic polycarboxylic acid resins used in Paint B are same as those exemplified as synthetic polycarboxylic acid resins in Paint A, but neutralized with a neutralizing agent to such extent exceeding (by 30-80%) the neutralization degree of the resin used in Paint A. The neutralizing agents used for this purpose may be the same as those used in Paint A. It is preferable that the acid groups of the synthetic polycarboxylic acid resin used in Paint B should be neutralized with an excess amount of a neutralizing agent, namely with an amount in excess over the equivalent, so that a portion of the neutralizing agent remains unreacted. The kinds and amounts of the amino resins, pigments and additives in Paint B are same as those in case of Paint A.

In the two-pack compositions according to the present invention, ammonia and/or an amine or a solution of these prepared by diluting them, for example, with water or an organic solvent can be used (Neutralizing Agent C) in place of Paint B. As such neutralizing agents there may be used those other than the neutralizing agents used for the neutralization of the synthetic polycarboxylic acids in Paint A and Paint B. As the organic solvents for diluting these neutralizing agents, there can be used, for example, mono- or di-alkyl ethers of ethylene glycol or propylene glycol, alcohols and ketones. In the Neutralizing Agent C the concentration of ammonia and/or amine is preferably at least 10%.

It is preferable that the amount of the amino resin which is made contained in Paint A or Paint B is less than 40 weight percent based on each of the synthetic polycarboxylic acid resins.

As mentioned before the Paint A or B is diluted with water or a mixture of water and organic solvent. Preferably the organic solvent is hydrophilic but it can partly be a hydrophobic solvent. Examples of hydrophilic solvents are alcohols, glycols, ketones, etc. Examples of hydrophobic solvents are hydrocarbons. The amount of such organic solvent may be 5-50% based on the total amount of water and organic solvent.

Paint A is translucent to turbid and assumes the appearance of the so-called colloid disperse polymer resin paint. Paint A represents a low viscosity so that it is good in applicability but is liable to sag. Paint B contains a resin with a neutralization degree higher than that in Paint A, and is translucent to transparent in appearance (desirably neutralized in excess over perfect neutralization). Accordingly, Paint B represents a high viscosity so that its applicability is not good. When diluted to an easy-to-work state, it is liable to sag. Thus, Paint A and Paint B are of no practical use when used singly. But when Paint A and Paint B are contacted with each other in a wet state upon application, the viscosity of the film formed by contact increases rapidly and the mixed film of Paint A and Paint B as a whole becomes to assume a gel state, thus giving no sag and no spray unevenness. The finished appearance of the film becomes comparable to that of the solvent type paint in general. In actual use or application it is preferable the amount of Paint B is 10-50 parts by weight per 100 parts of Paint A. Further the amount of Neutralizing Agent C is preferable to be 1-20 parts by weight based on 100 parts of Paint A.

In the present invention the two-pack aqueous paint compositions are applied in the order of Paint A, Paint B or Neutralizing Agent C, or applied at the same time, or vice versa Paint B or Neutralizing Agent C is applied in advance and while it is still in a wet state Paint A is applied on it, whereby Paint A is mixed into contact with Paint B or Neutralizing Agent C to increase the neutralization degree of the formed film, thus increasing the viscosity of the film rapidly and thereby preventing the fluidity of the film observed in conventional water-diluting type paints. Therefore, it is possible to form thick film preventing from sagging, pinholes and spray unevenness and having a stable, elegant finished appearance.

The paint and neutralizing agent may be applied in any proper manner such as spraying or electrostatic coating.

Especially in the case of paints containing metal powder such as aluminum powder, it has been difficult to obtain a uniform finished surface as a whole because the metal powder particles move in the formed film on account of the high fluidity of the paint, but the two-pack aqueous paint compositions according to the present invention have no such defect and it is possible to obtain a painted film having an elegant finished surface.

After the film formation the film is subjected to heat curing by baking. The baking is usually conducted at 140-170° C. for 20-30 minutes.

The present invention is explained hereunder by way of examples.

EXAMPLES

The order of preparing paints is to mix a synthetic polycarboxylic acid resin with a pigment first, if any pigment should be contained in the paint, and finally another resin, neutralizing agent and additive are added to regulate the viscosity.

As Paints A, those having the compositions shown in Table 1 were prepared.

Table 1

| Paint A | A-1 | A-2 | A-3 |
|---|---|---|---|
| Pigment (Al powder) | 1.9 | 1.9 | 1.9 |
| Synthetic polycarboxylic acid (acrylic resin) 70% N.V. | 48.21 | 60.0 | — |
| Synethetic polycarboxylic acid (alkyd resin) 80% N.V. | — | — | 42.19 |
| Amino resin (hexamethoxymethylmelamine) | 11.25 | 11.25 | 11.25 |
| Neutralizing agent (dimethylethanolamine) | 1.88 | 0.40 | 1.69 |

Table 1-continued

| Paint A | A-1 | A-2 | A-3 |
|---|---|---|---|
| Diluent (water) | 33.76 | 26.45 | 42.97 |
| Composition in total | 100 | 100 | 100 |
| Neutralization degree (%) | 50 | 30 | 30 |
| Non-volatile matter (%) | 46.9 | 55.2 | 46.9 |
| Viscosity (poise/20° C.) | 3.6 | 4.1 | 2.8 |
| Number average molecular weight of synthetic polycarboxylic acid | 15000 | 15000 | 2500 |
| Acid value of synthetic polycarboxylic acid | 70 | 20 | 105 |

As Paints B, those having the compositions as shown in Table 2 were prepared.

Table 2

| Paint B | B-1 | B-2 | B-3 |
|---|---|---|---|
| Synthetic polycarboxylic acid (acrylic resin) resin) 70% N.V. | 48.21 | 30.0 | — |
| Synthetic polycarboxylic acid (alkyd resin) 50% N.V. | — | — | 21 |
| Amino resin (hexamethoxymethylmelamine) | 11.25 | 11.25 | 11.25 |
| Neutralizing agent (dimethylethanolamine) | 5.26 | 0.6 | 4.2 |
| Diluent (water) | 35.28 | 58.15 | 63.55 |
| Composition in total | 100 | 100 | 100 |
| Neutralization degree (%) | 140 | 90 | 150 |
| Non-volatile matter (%) | 45.0 | 32.3 | 28.1 |
| Viscosity (poise/20° C.) | 46.6 | 50.3 | 49.7 |
| Number average molecular weight of synthetic polycarboxylic acid | 5000 | 3500 | 2500 |
| Acid value of synthetic polycarboxylic acid | 70 | 20 | 105 |

The following solutions were prepared as Neutralizing Agents C.

| C-1 Dimethylethanolamine | 100% |
| C-2 Monoisopropanolamine | 100% |
| C-3 Dimethylethanolamine | 40% solution in butyl glycol |
| C-4 Dimethylethanolamine | 45% aqueous solution |

The painting operation was performed as described below, using Paint A and Paint B or Neutralizing Agent C. The painting conditions were as follows:

| Spray booth temperature: | 25° C. |
| Spray booth humidity: | 40% RH, 75% RH and 90% RH |

The baking conditions were as follows:
Setting: In the atmosphere at 60° C. for 7 minutes
Baking: The atmosphere was raised to 160° C. in 10 minutes.
Curing of the film: 160° C. for 20 minutes

EXAMPLE 1

Paint A was applied on a zinc phosphate-treated iron plate by means of a spray gun such that the thickness of the film became about 40 $\mu$. Subsequently, within about 60 seconds, Paint B or Neutralizing Agent C was sprayed thereon by means of a spray gun such that it formed a film having a thickness of about 3 $\mu$ or 1 $\mu$, respectively. The results are as follows.

Table 3

| | | | Booth Conditons (25° C.) | | | | | |
|---|---|---|---|---|---|---|---|---|
| | | | 40% RH | | 75% RH | | 90% RH | |
| Exp. No. | A | ← B or C | Finished surface | Sag limit ($\mu$) | Finished surface | Sag limit ($\mu$) | Finished surface | Sag limit ($\mu$) |
| 1 | A-1 | — | Orange peel No luster | 61 | Some sag Δ | 58 | Sag Δ | 38 |
| 2 | — | B-1 | Some sag Δ | 53 | Sag X | 21 | Film formation impossible xx | 8 |
| 3 | A-1 ← | B-1 | o | 64 | o | 64 | o | 63 |
| 4 | A-1 ← | B-2 | — | — | o | 61 | o | 59 |
| 5 | A-2 ← | B-1 | — | — | o | 63 | o | 63 |
| 6 | A-2 ← | B-2 | — | — | o | 62 | — | — |
| 7 | A-3 ← | B-3 | — | — | o | 54 | o | 53 |
| 8 | A-1 ← | C-1 | o | 69 | o | 68 | o | 69 |
| 9 | A-1 ← | C-2 | — | — | o | 65 | — | — |
| 10 | A-2 ← | C-3 | — | — | o | 57 | — | — |
| 11 | A-2 ← | C-4 | — | — | o | 55 | — | — |

Note:
← shows the order of application.
o Good
Δ Fairly good
x Bad

EXAMPLE 2

Paint A and Paint B or Neutralizing Agent C were sprayed on a zinc phosphate-treated iron plate at the same time by means of a spray gun such that Paint A would be about 40 $\mu$ thick and Paint B about 3 $\mu$ thick or Neutralizing Agent C about 1 $\mu$ thick. The results are as follows:

Table 4

| | | Booth conditions (25° C.) | | | | | |
|---|---|---|---|---|---|---|---|
| | | 40 % RH | | 75 % RH | | 90 % RH | |
| Exp. no. | A⇌B or C | Finished surface | Sag limit ($\mu$) | Finished surface | Sag limit ($\mu$) | Finished surface | Sag limit ($\mu$) |
| 12 | A-1 ⇌ B-1 | o | 67 | o | 67 | o | 65 |
| 13 | A-2 ⇌ B-1 | o | 66 | o | 66 | — | — |
| 14 | A-2 ⇌ B-2 | — | — | o | 68 | — | — |
| 15 | A-1 ⇌ C-4 | o | 75 | o | 74 | o | 70 |
| 16 | A-2 ⇌ C-4 | — | — | o | 61 | — | — |

Note: ⇌ shows simultaneous application.

EXAMPLE 3

Paint B or Neutralizing Agent C was applied on a zinc phosphate-treated iron plate, and within 60 seconds Paint A was applied thereon to form a film by means of a spray gun such that Paint A would give a film thickness of about 40 $\mu$, and Paint B about 3 $\mu$ or Neutralizing Agent C about 1 $\mu$. The results are as follows:

Table 5

| | | Booth conditions (25° C.) | | | | | |
|---|---|---|---|---|---|---|---|
| | | 40% RH | | 75% RH | | 90% RH | |
| Exp. no. | B or C ← A | Finished surface | Sag limit ($\mu$) | Finished surface | Sag limit ($\mu$) | Finished surface | Sag limit ($\mu$) |
| 17 | B-1 ← A-1 | o | 59 | o | 59 | o | 58 |
| 18 | B-1 ← A-2 | o | 57 | o | 56 | — | — |
| 19 | B-2 ← A-2 | — | — | o | 57 | — | — |
| 20 | C-1 ← A-1 | o | 61 | o | 62 | o | 62 |
| 21 | C-4 ← A-2 | — | — | o | 53 | o | 53 |

Experiment Nos. 1 and 2 in Example 1 correspond to conventional water-diluting type paints.

What we claim is:

1. In a process for coating a surface wherein an aqueous paint composition containing as the primary film-forming components: a synthetic polycarboxylic acid resin as the main binder component; an amino resin as a heat curing cross-linking agent for the polycarboxylic acid resin and a neutralizing agent for neutralizing the acid groups of the polycarboxylic acid resin, is applied to said surface and is thereafter heat cured by baking; the improvement comprising: applying the aqueous paint composition to the surface prior to heat curing as two separate compositions (A) and (B); said (A) comprising a synthetic polycarboxylic acid resin which has a number average molecular weight of above 2000 and an acid value of 10–150 and which is neutralized to a neutralization degree of 30–70%, and, as a heat curing cross-linking agent, an amino resin, the ratio of amino resin/polycarboxylic acid resin being 10/90 to 35/65; and said (B) comprising a synthetic polycarboxylic acid resin which has a number average nolecular weight of above 2000 and an acid value of 10–150 and which is neutralized to a neutralization degree 30–80% higher than that of the polycarboxylic acid resin of (A), and, as a heat curing cross-linking agent, an amino resin, the ratio of amino resin/polycarboxylic acid resin being 10/90 to 35/65.

2. The process of claim 1 wherein 10–50 parts by weight of (B) per 100 parts by weight of (A) are employed.

3. The process of claim 1 wherein the synthetic polycarboxylic acid resin is a polymer of copolymer of at least one carboxyl group-containing monomer selected from the group consisting of acrylic acid, methacrylic acid, itaconic acid, fumaric acid and vinyl acetate.

4. The process of claim 3 wherein said synthetic polycarboxylic acid resin is a copolymer of said at least one carboxyl group-containing monomer and at least one monomer copolymerizable therewith.

5. The process of claim 1 wherein said synthetic polycarboxylic acid resin is an oil-free alkyd resin or modified alkyd resin of (a) an acid selected from the group consisting of maleic acid anhydride, phthalic acid anhydride, adipic acid, tetrahydrophthalic acid anhydride, and trimellitic acid; and (b) a polyhydric alcohol selected from the group consisting of ethylene glycol, propylene glycol, trimethylolpropane, sorbitol, glycerine and pentaerythritol.

6. The process of claim 1 wherein the amino resin is a condensation product of formaline with melamine, urea or benzoguanamine or said condensation product etherified with methyl alcohol or butyl alcohol.

7. The process of claim 6 wherein the amino resin is hexamethoxymethylmelamine.

8. In a process for coating a surface wherein an aqueous paint composition containing as the primary film-forming components: a synthetic polycarboxylic acid resin as the main binder component; an amino resin as a heat curing cross-linking agent for the polycarboxylic acid resin and a neutralizing agent for neutralizing the acid groups of the polycarboxylic acid resin, is applied to said surface and is thereafter heat cured by baking; the improvement comprising: applying the aqueous paint composition to the surface prior to heat curing as two separate compositions (A) and (C); said (A) comprising a synthetic polycarboxylic acid resin which has a number average molecular weight of above 2000 and an acid value of 10–150 and which is neutralized to a neutralization degree of 30–70%, and, as a heat curing cross-linking agent, an amino resin, the ratio of amino resin/polycarboxylic acid resin being 10/90 to 35/65; and said (C) comprising a neutralizing agent selected from ammonia and an organic amine.

9. The process of claim 8 wherein 1–20 parts by weight of (C) per 100 parts by weight of (A) is employed.

10. The process of claim 8 wherein the synthetic polycarboxylic acid resin is a polymer of copolymer of at least one carboxyl group-containing monomer selected from the group consisting of acrylic acid, methacrylic acid, itaconic acid, fumaric acid and vinyl acetate.

11. The process of claim 10 wherein said synthetic polycarboxylic acid resin is a copolymer of said at least one boxyl group-containing monomer and at least one monomer copolymerizable therewith.

12. The process of claim 8 wherein said synthetic polycarboxylic acid resin is an oil-free alkyd resin or modified alkyd resin of (a) an acid selected from the group consisting of maleic acid anhydride, phthalic acid anhydride, adipic acid, tetrahydrophthalic acid anhydride, and trimellitic acid; and (b) a polyhydric alcohol selected from the group consisting of ethylene glycol, propylene glycol, trimethylolpropane, sorbitol, glycerine and pentaerythritol.

13. The process of claim 8 wherein the amino resin is a condensation product of formaline with melamine, urea or benzoguanamine or said condensation product etherified with methyl alcohol or butyl alcohol.

14. The process of claim 13 wherein the amino resin is hexamethoxymethylmelamine.

15. The process of claim 8 wherein the organic amine is selected from the group consisting of methylamine, dimethyltriamine, triethylamine, monoisopropanolamine, diisopropanolamine, dimethylethanolamine, morpholine and diethylenetriamine.

* * * * *